United States Patent [19]

Break

[11] Patent Number: 4,530,493

[45] Date of Patent: Jul. 23, 1985

[54] MACHINE TABLE FASTENER ASSEMBLY

[76] Inventor: Douglas G. Break, Independence Green Apts, 24654 Madison Ct., Apt. 241, Farmington Hills, Mich. 48024

[21] Appl. No.: 635,564

[22] Filed: Jul. 30, 1984

[51] Int. Cl.³ .............................................. B23Q 3/02
[52] U.S. Cl. ...................................................... 269/93
[58] Field of Search ....................... 269/91, 93, 94, 99, 269/100, 208, 900

[56] References Cited

U.S. PATENT DOCUMENTS 1,033,758  7/1912  Howell .................................. 269/93
3,770,261  11/1973  Anderson ............................. 269/93

Primary Examiner—Robert C. Watson
Attorney, Agent, or Firm—Gifford, VanOphem, Sheridan, Sprinkle & Nabozny

[57] ABSTRACT

The present invention provides a fastener assembly for use with a machine table having a work supporting surface and at least one elongated T-slot formed in the table and opened to the surface. The fastener assembly includes an elongated stud threaded at one end and a cross member secured transversely across its other end. This cross member is dimensioned to that it is insertable into the T-slot and thereafter rotatable within the wider portion of the T-slot. The fastener assembly further includes a U-shaped collar having an opening in its base through which the stud is slidably received. The collar is slid over the stud and into the T-slot whereupon the legs of the collar are positioned on opposite sides of the cross member and thus prevent rotation of the cross member. In a second embodiment, a square shoulder is formed above the cross member which fits within the narrow portion of the T-slot to prevent rotation of the stud while a spring carried by the cross member urges the shoulder upwardly and into the narrower portion of the slot.

4 Claims, 7 Drawing Figures

MACHINE TABLE FASTENER ASSEMBLY

BACKGROUND OF THE INVENTION

I. Field of the Invention

The present invention relates generally to fasteners and, more particularly, to a fastener for a machine table having at least one T-slot.

II. Description of the Prior Art

There are many types of machining tables, such as those used with vertical mills, drill presses and the like, which have a work supporting surface on which the work is positioned. In addition, a plurality of inverted T-shaped slots are formed in the table so that the leg or narrower portion of the slot is opened to the work supporting surface while the cross bar or wider portion of the T-slot is positioned below the surface of the table.

In order to clamp the work to the table, it has been the previous practice to slide T bolts in from the end of the slot on the table and to a position adjacent the work. These previously known T bolts are dimensioned so that, although the T bolts can longitudinally slide along the slot, they cannot rotate within the slot. Consequently, with the T bolt positioned adjacent the work, a clamp or other fastener is secured to the upwardly extending end of the T bolt by a nut or other conventional fastener. Since the T bolt cannot rotate within the slot, the nut and clamp can be tightened as desired.

A primary disadvantage of these previously known T bolts used for clamping the work to the table is that it is not possible to insert a T bolt in between two T bolts or other items that are already secured to the work table. Such an additional T bolt is often required when an additional clamping is desired. Consequently, when this has occurred, it is necessary to unclamp the work, install the additional T bolt, and then reclamp the work. This previous procedure, of course, is time consuming and therefore costly.

A still further disadvantage of these previously known devices is that frequently the T bolt installed in the table is too short. When this occurs, a shaft extension is typically attached to the T bolt but such extensions are relatively expensive and cumbersome to install.

In one previously known device, a T nut is positioned within the slot and a stud is thereafter screwed into the T nut. While this eliminates the need for stud extensions, it is still not possible to insert a T nut in between two T nuts or other items secured to the table thus requiring disassembly of the setup.

SUMMARY OF THE PRESENT INVENTION

The present invention provides a fastener assembly for a work table having a T slot which overcomes all of the above mentioned disadvantages of the previously known devices.

In brief, the fastener assembly of the present invention comprises an elongated stud threaded at one end and a cross member which is fixedly secured transversely across its other end. This cross member has a width less than the width of the slot opening to the table surface and a length greater than the width of the wider portion of the T slot. Consequently, the cross member is insertable into the T slot from the top surface of the table and, after insertion, is rotatable so that the cross member is positioned within the wider portion of the slot and so that the stud extends perpendicularly outwardly from the surface of the table in the desired fashion.

In order to prevent rotation of the stud so that a nut an be tightened onto the stud, a U-shaped collar has an opening in its base through which the stud is slidably received. The U-shaped collar has a width less than the width of the slot opening in the table so that the collar is insertable into the T-slot and below the table surface. In doing so, the legs of the collar are positioned on opposite sides of the cross member which prevents rotation of the cross member as well as its attached stud.

In a second preferred embodiment of the invention, a square shoulder is formed above the cross member which, when positioned within the narrow portion of the slot, prevents rotation of the stud. A spring carried by the cross member allows the cross member and shoulder to be inserted into the wider portion of the slot. The fastener is then rotated 90° and released whereupon the spring forces the shoulder into the narrower portion of the slot and prevents rotation of the stud.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF PREFERRED EMBODIMENTS OF THE INVENTION

Figure 1:
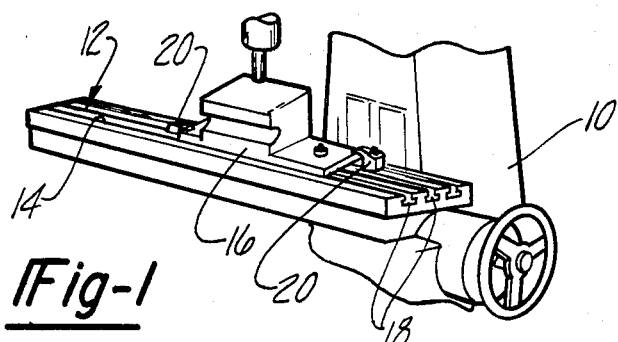
FIG. 1 is a fragmentary perspective view illustrating the present invention utilized with a work table.

With reference first to FIG. 1, a machine 10 is thereshown having a work table 12 with an upper surface 14. A work 16 is supported on the surface 14 and is attached to the surface 14 by a plurality of clamping members 20 in a fashion which will be subsequently described. With the work 16 clamped to the top surface 14 of the machine table 12, a machining operation, such as milling, drilling or the like, is then performed on the work 16.

Figure 2:
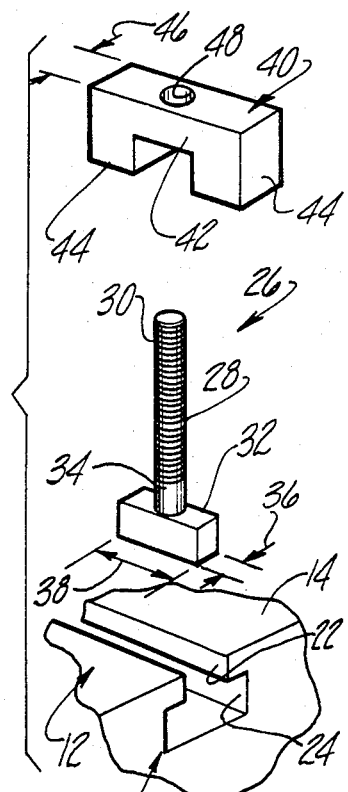
FIG. 2 is an exploded elevational view of the preferred embodiment of the invention.

With reference now particularly to FIG. 2, the table 12 includes at least one first slot 22 having a predetermined width and which is open to the table surface 14. This slot 22 is open to a lower slot 24 havng a width greater than the first slot 22 and the slots 22 and 24, together, form an inverted T shaped slot 18 in the table 12.

Still referring to FIG. 2, a preferred embodiment of the fastener assembly 26 of the present invention is thereshown and comprises an elongated cylindrical stud 28 which is externally threaded at one end 30. A substantially rectangular cross member 32 is secured to the opposite end 34 of the stud 28 so that the cross member 32 extends generally transversely or perpendicularly to the axis of the stud 28. In addition, the width 36 of the cross member 32 is less than the width of the slot 22, its length 38 is greater than the width of the slot 22 but less than the width of the slot 24 in the table 12 and the height of the cross member 32 is less than the depth of the slot 24.

Preferably, the stud 28 is fixedly secured to the cross member 32 by welding or the like. Alternately, the stud 28 is detachably secured to the cross member 32 by a threaded connection or the like.

With reference now still to FIG. 2, the fastener assembly 26 further includes a U-shaped collar 40 having a base 42 and two legs 44. The width 46 of the collar 40 is less than the width of the table slot 22 for a reason to be subsequently described. In addition, the collar 40 includes an opening 48 formed in its base 42 which is dimensioned to slidably receive the stud 28 therethrough.

Figure 3:
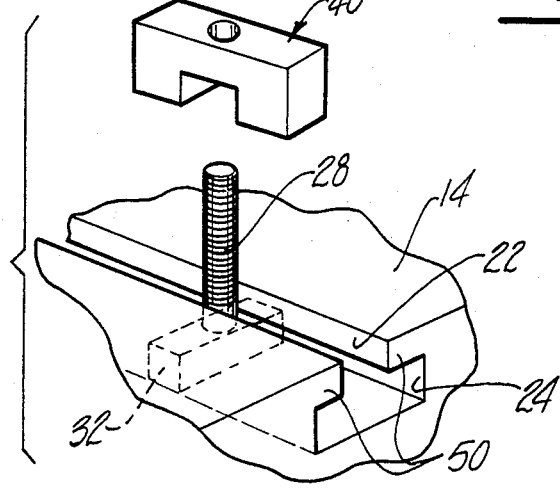
FIG. 3 is a fragmentary elevational view of the preferred embodiment of the invention and with parts removed for clarity.

With reference now particularly to FIGS. 2 and 3, the cross member 32 is insertable through the slot 22 and into the slot 24 in a direction perpendicular to the plane of the table surface 14. Once inserted, the cross member 32 is rotated ninety degrees to the position shown in FIG. 3 in which the cross member 32 extends transversely or perpendicularly to the axis of the slot 24. In doing so, a portion of each end of the cross member 32 is positioned underneath a ledge 50 formed by the junction of the slots 22 and 24. Thus, with the stud 28 and cross member 32 in the position shown in FIG. 3, the stud 28 extends perpendicularly outwardly from the surface 14 of the machining table 12 while the cross member 32 prevents axial movement of the stud 28.

Figure 4:
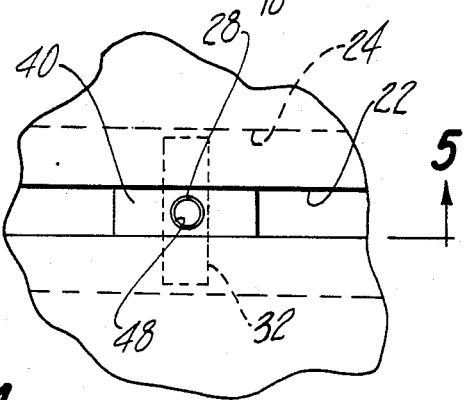
FIG. 4 is a fragmentary top view of the preferred embodiment of the invention.
Figure 5:
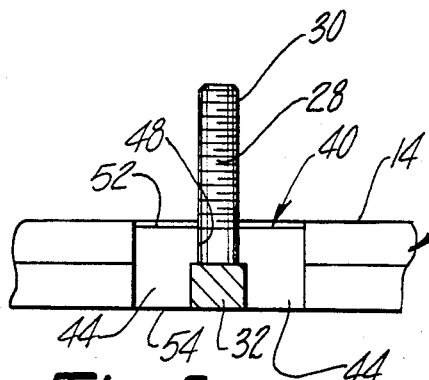
FIG. 5 is a fragmentary sectional view taken substantially along lines 5—5 in FIG. 4.

With reference now to FIGS. 2, 4 and 5, with the cross member 32 positioned within and transversely across the slot 24, the collar 40 is moved from the position shown in FIG. 2 and to the position shown in FIGS. 4 and 5 in which the collar 40 is positioned within the slots 22 and 24 and so that the stud 28 extends through the collar opening 48. In doing so, the legs 44 of the collar 40 are positioned on opposite sides of the cross member 32 and thus prevents rotation of the cross member 32 within the slot 24. In addition, the height of the collar 40, i.e. the distance between its top surface 52 and bottom surface 54 preferably is less than the depth of the T slot 18 so that the collar 40 is recessed below the surface 14 of the machining table 12 and thus prevents interference between the work 16 and the collar 40.

With both the cross member 32 and collar 40 positioned within the T slot 18 as shown in FIGS. 4 and 5, the clamping member 20 (FIG. 1) is secured by a nut to the threaded end 30 of the stud 28 in order to securely attach the work 16 to the table 12.

Figures 6, 7:
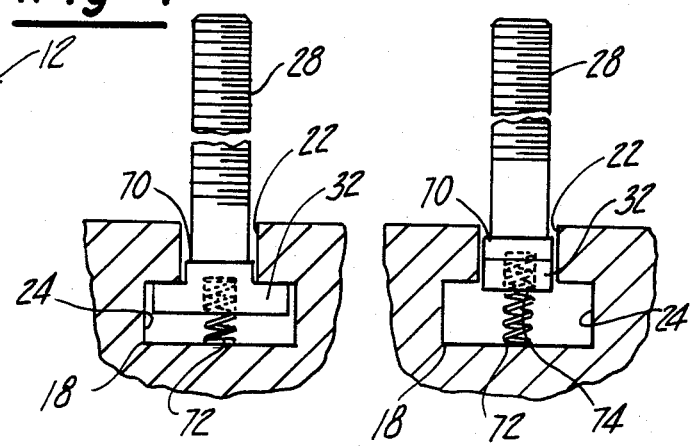
FIGS. 6 and 7 are fragmentary side views showing a second preferred embodiment of the invention.

With reference now to FIGS. 6 and 7, a modification of the fastener assembly is thereshown in which a square or rectangular shoulder 70 is formed on the top of the cross member 32. The width of the shoulder 70 is dimensioned so that the shoulder 70, together with the cross member 32 is insertable from the top of the table and into the wide portion 24 of the slot 18 as shown in phantom line in FIG. 7. A compression spring 72 carried in a bore 74 in the cross member 32, however, resists the insertion of the cross member 32 and shoulder 70 into the slot 18.

After insertion into the slot 18, the stud 28 is rotated ninety degrees to the position shown in FIG. 6 and released whereupon the spring 72 forces the shoulder 70 into the narrow portion 22 of the slot 18. Furthermore, the length of the shoulder 70, i.e. the distance between its parallel planar ends 76 (FIG. 6), is substantially the same, or slightly less, than the width of the slot portion 22 which prevents rotation of the stud 28 in the desired fashion. In order to subsequently remove the fastener from the slot, the stud is simply depressed, rotated ninety degrees and lifted from the slot.

From the foregoing, it can be seen that the fastener assembly provides a simple, inexpensive and yet totally efficient device for attaching a clamping member or the like to a machining table having at least one T slot. Furthermore, since both the stud 28 and its collar 40 are insertable into the machining table in a direction perpendicular to the machine table surface 14, the fastener assembly 26 can be easily attached to any desired position along the table 12. Furthermore, in the event that a fastener assembly 26 with a longer stud 28 is desired or required, it is merely necessary to remove the collar 40 and replace the stud 28 and cross member 32 with a different stud 28 and cross member 32 in which the stud 28 is longer. Consequently, the previously known necessity of using stud extensions is completely obviated.

Having described my invention, however, many modifications thereto will become apparent to those skilled in the art to which it pertains without deviation from the spirit of the invention as defined by the scope of the appended claims.

I claim:

1. For use in conjunction with a machine table having a work supporting surface, at least one elongated first slot formed in said table and open to said surface, said first slot being open to an elongated second slot formed in said table beneath said surface, said second slot having a width greater than said first slot, a fastener assembly comprising:

an elongated stud threaded at one end, a cross member secured transversely across the other end of said stud said cross member having two spaced apart and parallel sides with a width between said sides less than the width of said first slot and a length greater than the width of said first slot but less than the width of said second slot so that said cross member is insertable through said first slot and rotatable in said second slot to a position transverse to the axis of said second slot, and means insertable into said slots for preventing rotation of said cross member comprising a U-shaped collar having a base and two legs, said collar having a width less than the width of said first slot and an opening in said base through which said stud is slidably received, wherein, with said cross member positioned in said second slot and rotated so that the axis of said cross member is transverse to the axis of said second slot and with said collar positioned over said stud, said legs extend downwardly into said second slot so that one leg is positioned along each side of said cross member to thereby lock said cross member against rotation.

2. The invention as defined in claim 1 wherein said first and second slots together form a T-shaped slot in cross section and wherein said cross member comprises end portions which extend outwardly from opposite sides of said stud.

3. The invention as defined in claim 1 wherein said cross member is fixedly secured to said stud.

4. The invention as defined in claim 1 wherein said collar has a height less than the aggregate depth of said slots so that, with said collar positioned in said slots, said collar is wholly positioned within said slots and below the work supporting surface.

* * * * *